United States Patent
Hatakeyama et al.

(10) Patent No.: US 9,663,593 B2
(45) Date of Patent: *May 30, 2017

(54) POLYMER COMPOUND FOR A CONDUCTIVE POLYMER AND METHOD FOR PRODUCING SAME

(71) Applicant: SHIN-ETSU CHEMICAL CO., LTD., Tokyo (JP)

(72) Inventors: Jun Hatakeyama, Jyoetsu (JP); Takayuki Nagasawa, Jyoetsu (JP); Koji Hasegawa, Jyoetsu (JP); Masaki Ohashi, Jyoetsu (JP); Masayoshi Sagehashi, Jyoetsu (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/752,425

(22) Filed: Jun. 26, 2015

(65) Prior Publication Data

US 2016/0017068 A1  Jan. 21, 2016

(30) Foreign Application Priority Data

Jul. 18, 2014 (JP) ................................. 2014-148167

(51) Int. Cl.

| | | |
|---|---|---|
| C08F 28/02 | (2006.01) | |
| C08F 14/18 | (2006.01) | |
| C08F 214/18 | (2006.01) | |
| C08F 228/02 | (2006.01) | |
| C08F 128/02 | (2006.01) | |

(52) U.S. Cl.

CPC .............. C08F 28/02 (2013.01); C08F 14/18 (2013.01); C08F 14/185 (2013.01); C08F 214/18 (2013.01); C08F 214/182 (2013.01); C08F 214/186 (2013.01); C08F 228/02 (2013.01); C08F 128/02 (2013.01)

(58) Field of Classification Search

CPC ...... C08F 28/02; C08F 128/02; C08F 228/02; C08F 14/18; C08F 14/185; C08F 114/15; C08F 114/185; C08F 14/182; C08F 14/186

See application file for complete search history.

(56) References Cited

U.S. PATENT DOCUMENTS

| | | | | |
|---|---|---|---|---|
| 7,812,105 B2 * | 10/2010 | Nagai | ................... | C07C 309/10 430/270.1 |
| 2008/0085469 A1 * | 4/2008 | Ohsawa | ................ | C07C 309/12 430/286.1 |
| 2012/0202153 A1 * | 8/2012 | Hatakeyama | ......... | G03F 7/0045 430/283.1 |
| 2012/0328993 A1 * | 12/2012 | Utsumi | ................ | C08F 228/02 430/325 |

FOREIGN PATENT DOCUMENTS

| | | | | |
|---|---|---|---|---|
| JP | 2008-146913 A | 6/2008 | | |
| JP | WO 2015015598 A1 * | 2/2015 | ............. | H01M 4/13 |

* cited by examiner

Primary Examiner — Ling Choi
Assistant Examiner — David L Miller
(74) Attorney, Agent, or Firm — Oliff PLC

(57) ABSTRACT

The present invention provides a polymer compound for a conductive polymer, containing one or more repeating units (a) represented by the following general formula (1), the polymer compound for a conductive polymer being synthesized by ion-exchange of a lithium salt, a sodium salt, a potassium salt, or a nitrogen compound salt of a sulfonic acid residue, and having a weight average molecular weight in the range of 1,000 to 500,000.

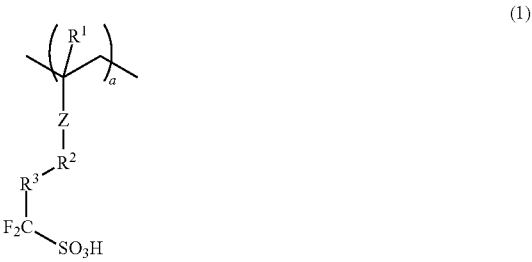

(1)

There can be provided a polymer compound for a conductive polymer having a specific superacidic sulfo group which is soluble in an organic solvent, and suitably used for a fuel cell or a dopant for a conductive material.

2 Claims, No Drawings

POLYMER COMPOUND FOR A CONDUCTIVE POLYMER AND METHOD FOR PRODUCING SAME

BACKGROUND OF THE INVENTION

Field of the Invention

The present invention relates to a polymer compound for a conductive polymer and a method for producing the same.

Description of the Related Art

A polymer containing a sulfo group has been used as a fuel cell or a dopant polymer for a conductive polymer. As a material for a fuel cell, vinyl-perfluoroalkyl ether sulfonic acid represented by Nafion (registered trademark) has been widely used, and as a dopant polymer for a conductive polymer, a polymer of vinylsulfonic acid or styrenesulfonic acid has been widely used (Patent Document 1).

The vinylperfluoroalkyl ether sulfonic acid has chemically high stability and excellent durability, but the glass transition point thereof is low, so that there is a problem that when a fuel cell using it is exposed to high temperature, the polymer causes heat flow whereby ion conductivity thereof is lowered. A superacidic polymer having a sulfo group an α-position of which has been fluorinated is effective for enhancing the ion conductivity, but a material having high glass transition point and chemical stability with such a structure has not yet been found out.

Also, a conductive polymer having a conjugated double bond such as a polythiophene, a polyaniline, a polypyrrole, etc., does not exhibit conductivity itself, but conductivity thereof is expressed by doping therein a strong acid such as sulfonic acid, etc. As the dopant, polystyrene sulfonic acid (PSS) has been most frequently used. This is because conductivity becomes the highest by doping PSS.

PSS is a water-soluble resin, and hardly dissolves in an organic solvent. Accordingly, a polythiophene using PSS as a dopant is also water-soluble.

The polythiophene using PSS as a dopant is highly conductive and highly transparent, so that it has been expected to be used as a conductive film for an organic EL lighting in place of ITO (indium-tin oxide). However, a luminous body of the organic EL chemically changes by moisture, thereby stopping to emit a light. That is, when a conductive film composed of a water-soluble resin is used for an organic EL, there is a problem that an emission lifetime of the organic EL becomes short due to the resin containing water.

PRIOR ART DOCUMENT

Patent Document

Patent Document 1: Japanese Patent Laid-Open Publication No. 2008-146913

SUMMARY OF THE INVENTION

The present invention has been accomplished in view of the above-described circumstances, and has an object to provide a polymer compound for a conductive polymer having a specific superacidic sulfo group which is soluble in an organic solvent, and suitably used for a fuel cell or a dopant for a conductive material. In addition, the present invention also has an object to provide a method for producing such a polymer compound for a conductive polymer.

To solve the above-mentioned problems, the present invention provides a polymer compound for a conductive polymer, comprising one or more repeating units (a) represented by the following general formula (1), the polymer compound for a conductive polymer being synthesized by ion-exchange of a lithium salt, a sodium salt, a potassium salt, or a nitrogen compound salt of a sulfonic acid residue, and having a weight average molecular weight in the range of 1,000 to 500,000,

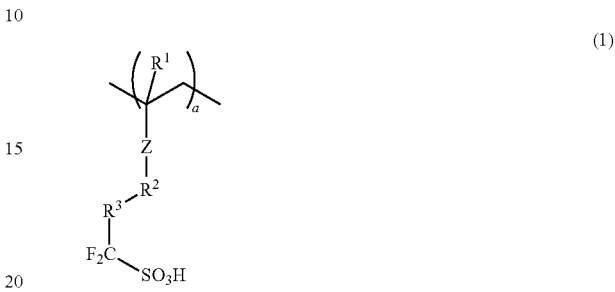

wherein $R^1$ represents a hydrogen atom or a methyl group; $R^2$ represents a single bond, an ester group, or a linear, branched, or cyclic hydrocarbon group having 1 to 12 carbon atoms and optionally having either or both of an ether group and an ester group; $R^3$ represents a linear or branched alkylene group having 1 to 4 carbon atoms where one or two hydrogen atoms in $R^3$ may be substituted by a fluorine atom(s); Z represents a phenylene group, a naphthylene group, or an ester group, and when Z is a phenylene group, $R^2$ does not include an ether group; and "a" is a number satisfying $0 < a \leq 1.0$.

Such a polymer compound for a conductive polymer can be a polymer compound for a conductive polymer having a specific superacidic sulfo group which is soluble in an organic solvent, and suitably used for a fuel cell or a dopant for a conductive material.

At this time, it is preferred that the polymer compound for a conductive polymer further comprise a repeating unit (b) represented by the following general formula (2),

wherein "b" is a number satisfying $0 < b < 1.0$.

When the repeating unit (a) is copolymerized with the polystyrene sulfonic acid of the repeating unit (b), the polymer compound can be used as a dopant polymer with high conductivity.

The repeating unit (a) represented by the general formula (1) preferably includes one or more kinds selected from repeating units (a1) to (a4) respectively represented by the following general formulae (3-1) to (3-4), (3-1)

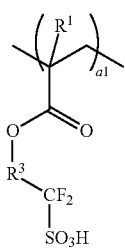

(3-2)

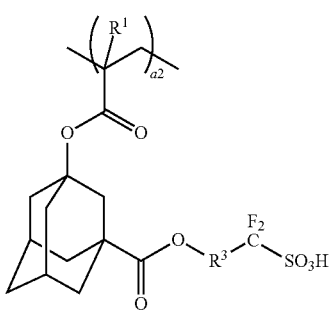

(3-3)

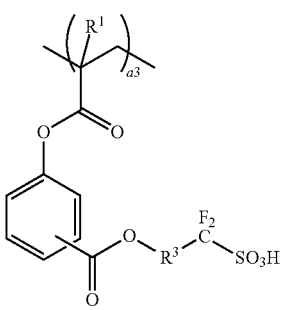

(3-4)

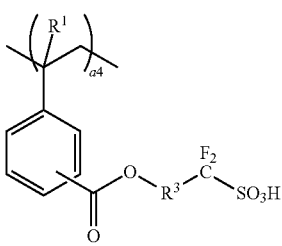

wherein $R^1$ and $R^3$ have the same meanings as defined above; and a1, a2, a3, and a4 are each a number satisfying $0 \leq a1 \leq 1.0$, $0 \leq a2 \leq 1.0$, $0 \leq a3 \leq 1.0$, $0 \leq a4 < 1.0$, and $0 < a1+a2+a3+a4 \leq 1.0$.

When such repeating units are included, the polymer compound is more suitable for a fuel cell or a dopant for a conductive material.

The lithium salt, the sodium salt, the potassium salt, or the nitrogen compound salt of the sulfonic acid residue is preferably composed of a repeating unit represented by the following general formula (4), (4)

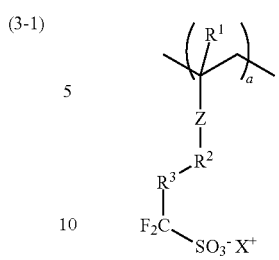

wherein $R^1$, $R^2$, $R^3$, Z, and "a" have the same meanings as defined above; and X represents lithium, sodium, potassium, or a nitrogen compound represented by the following general formula (5), (5)

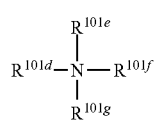

wherein $R^{101d}$, $R^{101e}$, $R^{101f}$, and $R^{101g}$ each represent a hydrogen atom, a linear, branched, or cyclic alkyl group, alkenyl group, oxoalkyl group, or oxoalkenyl group having 1 to 12 carbon atoms, an aryl group having 6 to 20 carbon atoms, or an aralkyl group or an aryloxoalkyl group each having 7 to 12 carbon atoms where a part or all of hydrogen atoms in these groups may be substituted by an alkoxy group(s); $R^{101d}$ and $R^{101e}$, or $R^{101d}$, $R^{101e}$, and $R^{101f}$ may form a ring, and when the ring is formed, $R^{101d}$ and $R^{101e}$, or $R^{101d}$, $R^{101e}$ and $R^{101f}$ represent an alkylene group having 3 to 10 carbon atoms or a heteroaromatic ring having therein the nitrogen atom in the formula.

Such a repeating unit can be easily converted into the repeating unit (a) represented by the general formula (1) by ion-exchange.

In addition, the present invention provides a method for producing a polymer compound for a conductive polymer containing a repeating unit (a) represented by the following general formula (1), the method comprising:

subjecting to polymerization reaction using a monomer that has a structure of a salt composed of a sulfonic acid residue and lithium, sodium, potassium, or a nitrogen compound; and after the polymerization reaction, converting the structure of the salt composed of the sulfonic acid residue and the lithium, the sodium, the potassium, or the nitrogen compound into a sulfo group by ion-exchange, (1)

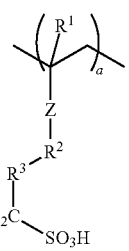

wherein $R^1$ represents a hydrogen atom or a methyl group; $R^2$ represents a single bond, an ester group, or a linear, branched, or cyclic hydrocarbon group having 1 to 12 carbon atoms and optionally having either or both of an ether group and an ester group; $R^3$ represents a linear or branched alkylene group having 1 to 4 carbon atoms where one or two hydrogen atoms in $R^3$ may be substituted by a fluorine atom(s); Z represents a phenylene group, a naphthylene group, or an ester group, and when Z is a phenylene group, $R^2$ does not include an ether group; and "a" is a number satisfying $0<a\leq1.0$.

When such a producing method is employed, the polymer compound for a conductive polymer containing the repeating unit (a) represented by the general formula (1) can be easily produced.

As mentioned above, the polymer compound for a conductive polymer of the present invention can be a polymer compound for a conductive polymer having a specific superacidic sulfo group which is soluble in an organic solvent, and suitably used for a fuel cell or a dopant for a conductive material.

When this polymer compound for a conductive polymer is used for a fuel cell, a material for a fuel cell having high dielectric constant can be obtained. Also, when this polymer compound is used as a dopant for a conjugated double bond polymer, a conductive film having high transparency, high conductivity, and high durability can be formed. Since the polymer compound for a conductive polymer of the present invention has superacidic sulfonic acid an α-position of which is fluorinated, it exhibits high performance as a dopant due to the strong ionic bond, and exhibits high stability as an ion. Therefore, when this polymer compound is used as a conductive material, it exhibits high conductivity and high stability. Moreover, it has excellent solubility in an organic solvent, so that deterioration of an organic EL device can be prevented by using it for a conductive film for an organic EL lighting.

Further, the producing method of the present invention facilitates producing such a polymer compound for a conductive polymer of the present invention.

DETAILED DESCRIPTION OF THE PREFERRED EMBODIMENTS

As mentioned above, it has been desired to develop a polymer compound for a conductive polymer having a specific superacidic sulfo group which is soluble in an organic solvent, and suitably used for a fuel cell or a dopant for a conductive material.

For the purpose of changing a water-soluble conductive polymer containing water, which causes the deterioration of an organic EL device, into an organic solvent-soluble polymer containing an extremely little water to prevent the deterioration of the device, the present inventors have tried to develop a polymer for a dopant having high solubility in an organic solvent from polystyrene sulfonic acid, which is a dopant soluble in water but difficultly soluble in an organic solvent. Since it is effective for increasing solubility in an organic solvent to introduce a long-chain alkyl group or fluorine, they have investigated to introduce fluorine, and found out that the problems can be solved particularly by using a polymer compound composed of a repeating unit having a sulfo group an a-position of which has been fluorinated, thereby bringing the invention to completion.

That is, the present invention is a polymer compound for a conductive polymer, comprising one or more repeating units (a) represented by the following general formula (1), the polymer compound for a conductive polymer being synthesized by ion-exchange of a lithium salt, a sodium salt, a potassium salt, or a nitrogen compound salt of a sulfonic acid residue, and having a weight average molecular weight in the range of 1,000 to 500,000,

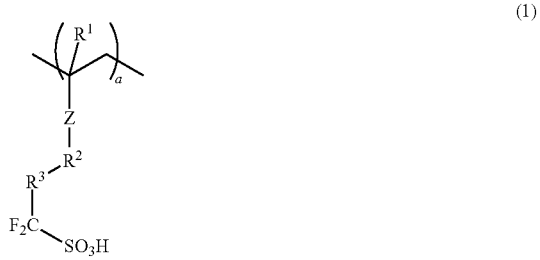

wherein $R^1$ represents a hydrogen atom or a methyl group; $R^2$ represents a single bond, an ester group, or a linear, branched, or cyclic hydrocarbon group having 1 to 12 carbon atoms and optionally having either or both of an ether group and an ester group; $R^3$ represents a linear or branched alkylene group having 1 to 4 carbon atoms where one or two hydrogen atoms in $R^3$ may be substituted by a fluorine atom(s); Z represents a phenylene group, a naphthylene group, or an ester group, and when Z is a phenylene group, $R^2$ does not include an ether group; and "a" is a number satisfying $0<a\leq1.0$.

Hereinafter, the present invention will be described in detail, but the present invention is not limited to these.

The polymer compound for a conductive polymer of the present invention is a polymer containing one or more repeating units (a) represented by the following general formula (1). The polymer compound for a conductive polymer of the present invention has particularly high transparency by containing the repeating unit (a) represented by the general formula (1),

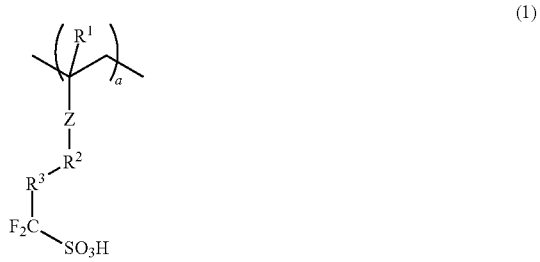

wherein $R^1$ represents a hydrogen atom or a methyl group; $R^2$ represents a single bond, an ester group, or a linear, branched, or cyclic hydrocarbon group having 1 to 12 carbon atoms and optionally having either or both of an ether group and an ester group; $R^3$ represents a linear or branched alkylene group having 1 to 4 carbon atoms where one or two hydrogen atoms in $R^3$ may be substituted by a fluorine atom(s); Z represents a phenylene group, a naphthylene group, or an ester group, and when Z is a phenylene group, $R^2$ does not include an ether group; and "a" is a number satisfying $0<a\leq1.0$.

In the general formula (1), $R^1$ represents a hydrogen atom or a methyl group.

$R^2$ represents a single bond, an ester group, or a linear, branched, or cyclic hydrocarbon group having 1 to 12 carbon atoms and optionally having either or both of an ether group and an ester group. Examples of the hydrocarbon group include an alkylene group, an arylene group, and an alkenylene group.

$R^3$ represents a linear or branched alkylene group having 1 to 4 carbon atoms, and one or two hydrogen atoms in $R^3$ may be substituted by a fluorine atom(s).

Z represents a phenylene group, a naphthylene group, or an ester group, and when Z is a phenylene group, $R^2$ does not include an ether group.

"a" is a number satisfying $0<a\leq1.0$.

Also, the repeating unit (a) represented by the general formula (1) preferably includes one or more kinds selected from repeating units (a1) to (a4) respectively represented by the general formulae (3-1) to (3-4),

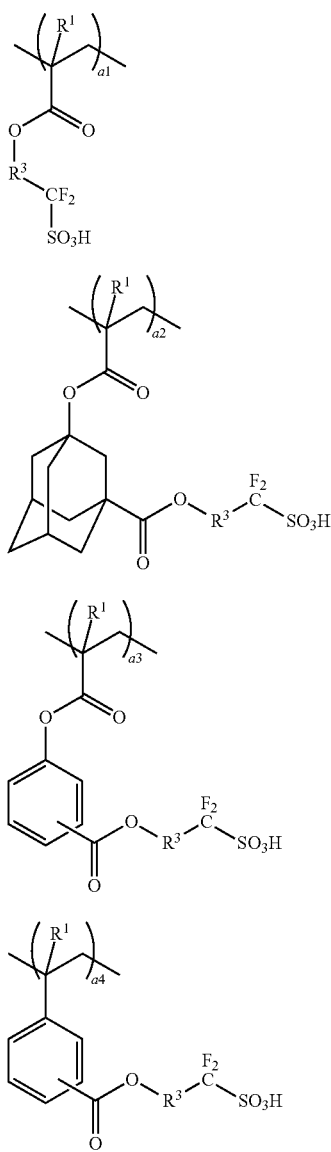

wherein $R^1$ and $R^3$ have the same meanings as defined above; and a1, a2, a3, and a4 are each a number satisfying $0\leq a1\leq1.0$, $0\leq a2\leq1.0$, $0\leq a3\leq1.0$, $0\leq a4<1.0$, and $0<a1+a2+a3+a4\leq1.0$.

When such repeating units are included, the polymer compound is more suitable for a fuel cell or a dopant for a conductive material.

Also, it is preferred that the polymer compound for a conductive polymer of the present invention further contain a repeating unit (b) represented by the following general formula (2). When the repeating unit (a) is copolymerized with the polystyrene sulfonic acid of the repeating unit (b), the polymer compound can be used as a dopant polymer with high conductivity.

In the above formula, "b" is a number satisfying $0<b<1.0$.

Also, as explained later, the polymer compound for a conductive polymer of the present invention may further contain a repeating unit (c) besides the repeating unit (a) and the repeating unit (b).

The polymer compound for a conductive polymer of the present invention is synthesized by ion-exchange of a lithium salt, a sodium salt, a potassium salt, or a nitrogen compound salt of a sulfonic acid residue.

The lithium salt, the sodium salt, the potassium salt, or the nitrogen compound salt of the sulfonic acid residue is preferably composed of a repeating unit represented by the general formula (4),

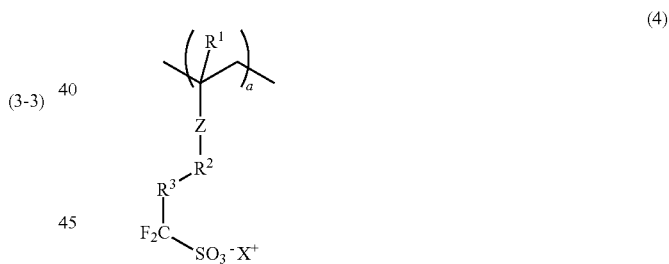

wherein $R^1$, $R^2$, $R^3$, Z, and "a" have the same meanings as defined above; and X represents lithium, sodium, potassium, or a nitrogen compound represented by the following general formula (5),

wherein $R^{101d}$, $R^{101e}$, $R^{101f}$ and $R^{101g}$ each represent a hydrogen atom, a linear, branched, or cyclic alkyl group, alkenyl group, oxoalkyl group, or oxoalkenyl group having 1 to 12 carbon atoms, an aryl group having 6 to 20 carbon atoms, or an aralkyl group or an aryloxoalkyl group each having 7 to 12 carbon atoms where a part or all of hydrogen atoms in these groups may be substituted by an alkoxy group (s); $R^{101d}$ and $R^{101e}$, or $R^{101d}$, $R^{101e}$, and $R^{101f}$ may form a ring, and when the ring is formed, $R^{101d}$ and $R^{101e}$, or $R^{101d}$, $R^{101e}$, and $R^{101f}$ represent an alkylene group having 3 to 10 carbon atoms or a heteroaromatic ring having therein the nitrogen atom in the formula.

Such a repeating unit is preferred since it can be easily converted into the repeating unit (a) represented by the general formula (1) by ion-exchange.

Also, the polymer compound for a conductive polymer of the present invention has a weight average molecular weight in the range of 1,000 to 500,000, preferably 2,000 to 200,000. If the weight average molecular weight is less than 1,000, the polymer compound is inferior in heat resistance. On the other hand, if the weight average molecular weight exceeds 500,000, its viscosity is increased, workability is worsened, and solubility in an organic solvent and water is lowered.

The weight average molecular weight (Mw) is a measured value in terms of polystyrene by gel permeation chromatography (GPC) using water, dimethylformamide (DMF), and tetrahydrofuran (THF) as a solvent.

The polymer compound for a conductive polymer of the present invention as mentioned above can be a polymer compound for a conductive polymer having a specific super-acidic sulfo group which is soluble in an organic solvent, and suitably used for a fuel cell or a dopant for a conductive material.

In addition, the present invention provides a method for producing such a polymer compound for a conductive polymer of the present invention.

That is, the producing method of the present invention is a method for producing a polymer compound for a conductive polymer containing a repeating unit (a) represented by the following general formula (1), the method comprising:

subjecting to polymerization reaction using a monomer that has a structure of a salt composed of a sulfonic acid residue and lithium, sodium, potassium, or a nitrogen compound; and after the polymerization reaction, converting the structure of the salt composed of the sulfonic acid residue and the lithium, the sodium, the potassium, or the nitrogen compound into a sulfo group by ion-exchange,

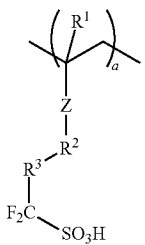

(1)

wherein $R^1$ represents a hydrogen atom or a methyl group; $R^2$ represents a single bond, an ester group, or a linear, branched, or cyclic hydrocarbon group having 1 to 12 carbon atoms and optionally having either or both of an ether group and an ester group; $R^3$ represents a linear or branched alkylene group having 1 to 4 carbon atoms where one or two hydrogen atoms in $R^3$ may be substituted by a fluorine atom(s); Z represents a phenylene group, a naphthylene group, or an ester group, and when Z is a phenylene group, $R^2$ does not include an ether group; and "a" is a number satisfying $0 < a \leq 1.0$.

The monomer to be used in the producing method of the present invention that has a structure of a salt composed of a sulfonic acid residue and lithium, sodium, potassium, or a nitrogen compound, and can give the repeating unit (a), may be specifically exemplified by the following.

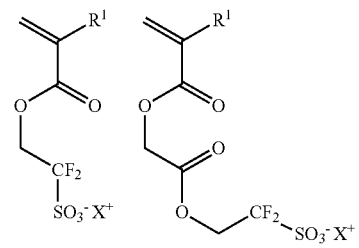

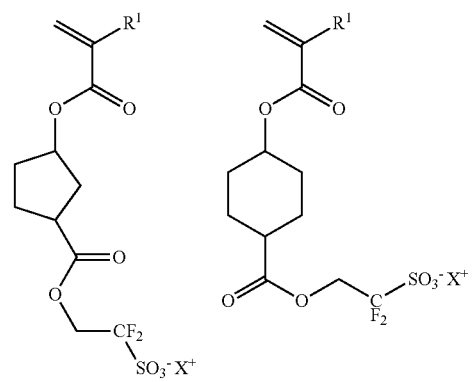

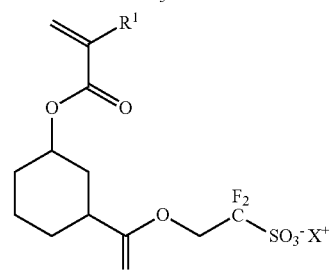

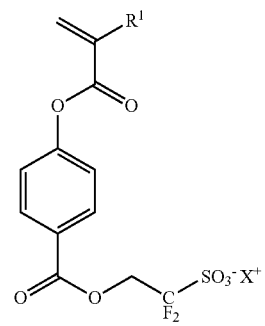

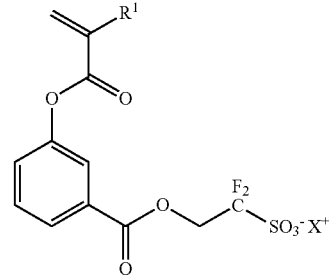

11
-continued
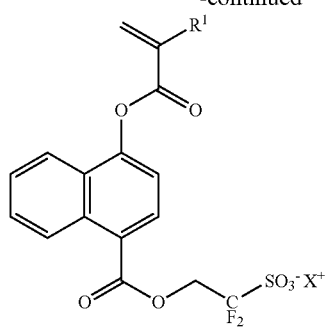
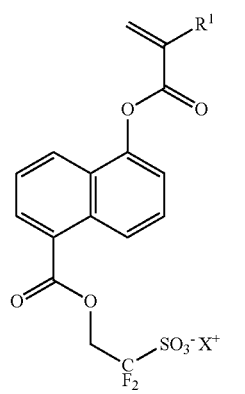
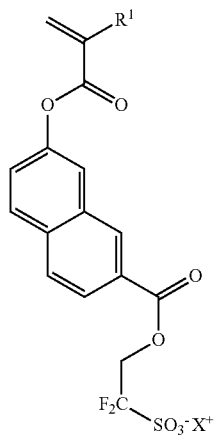
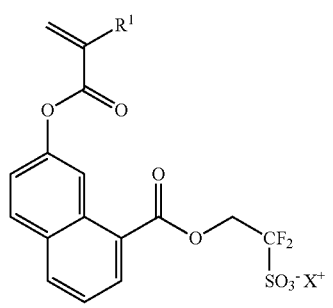
12
-continued
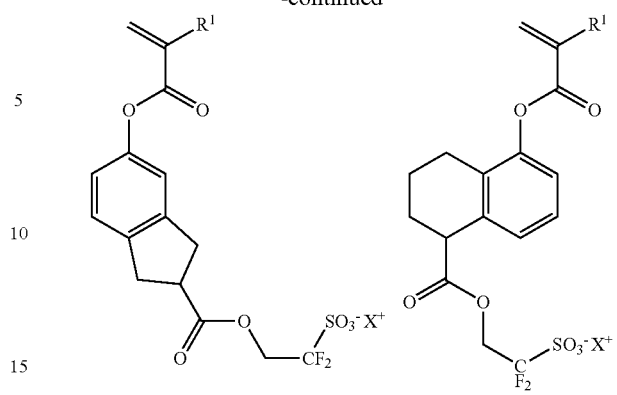
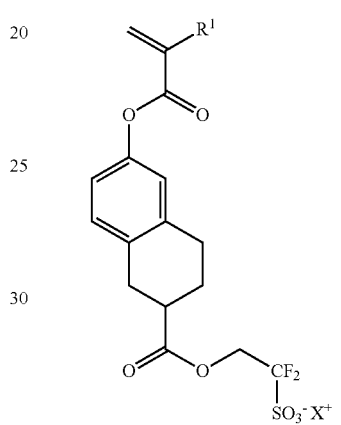
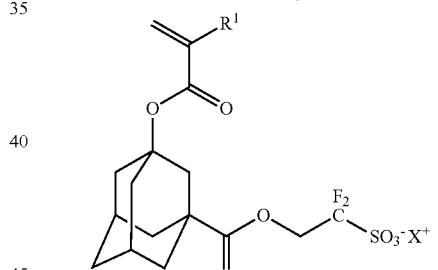
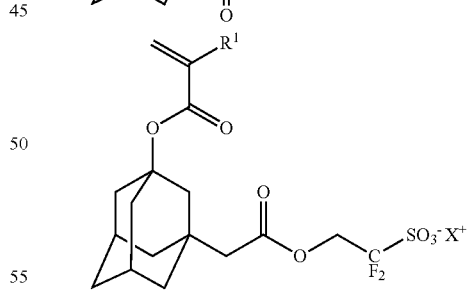
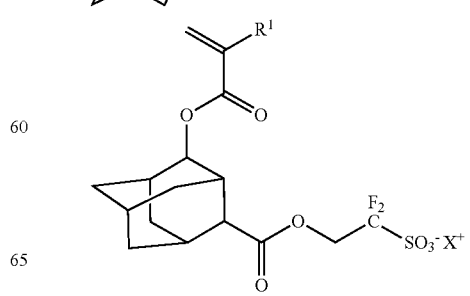

-continued
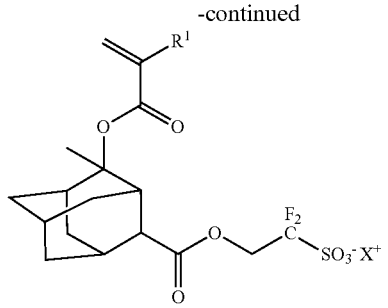
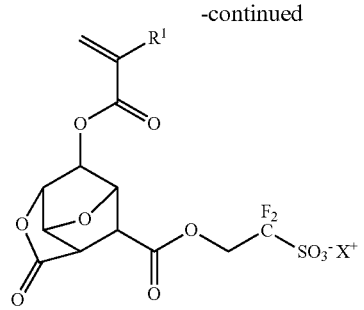
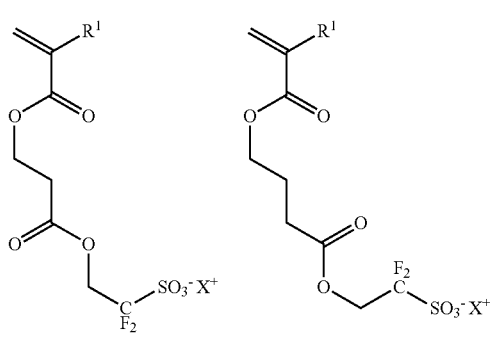
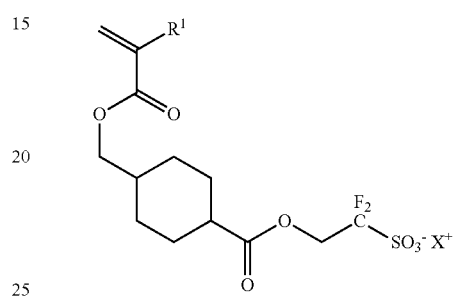
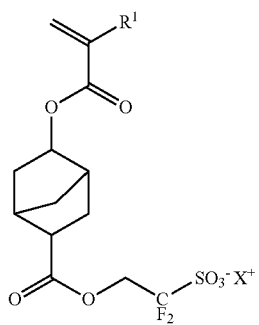
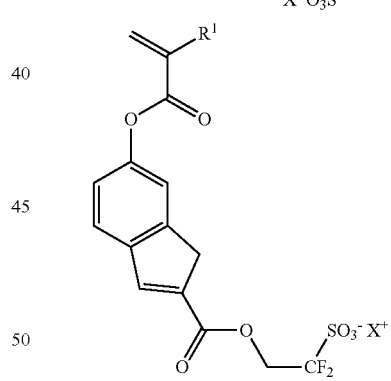
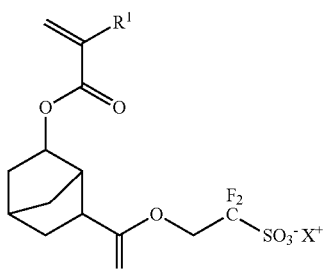
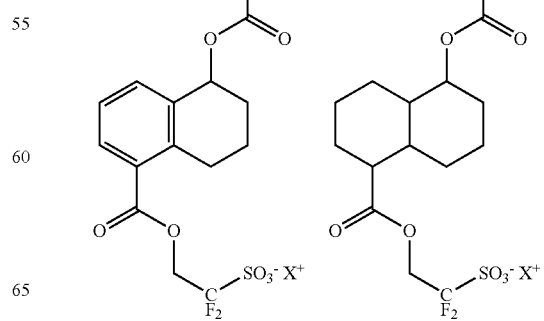
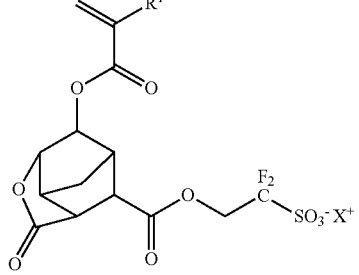

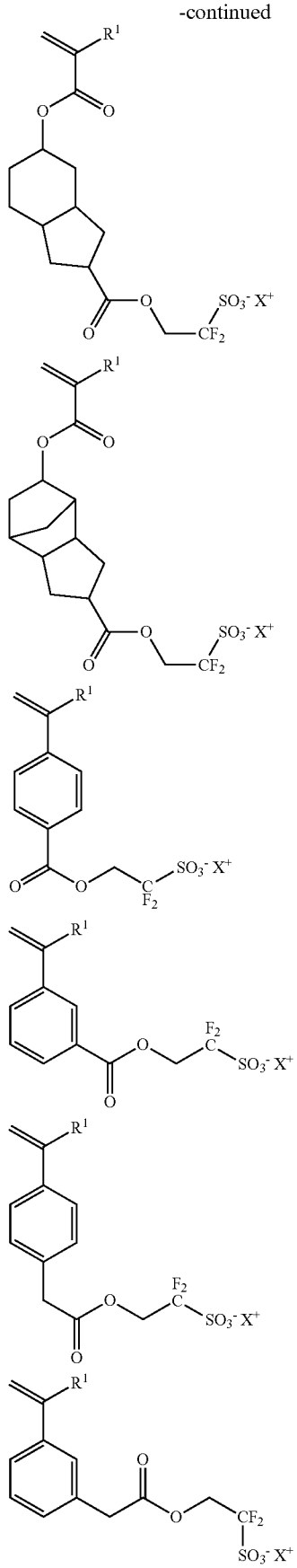
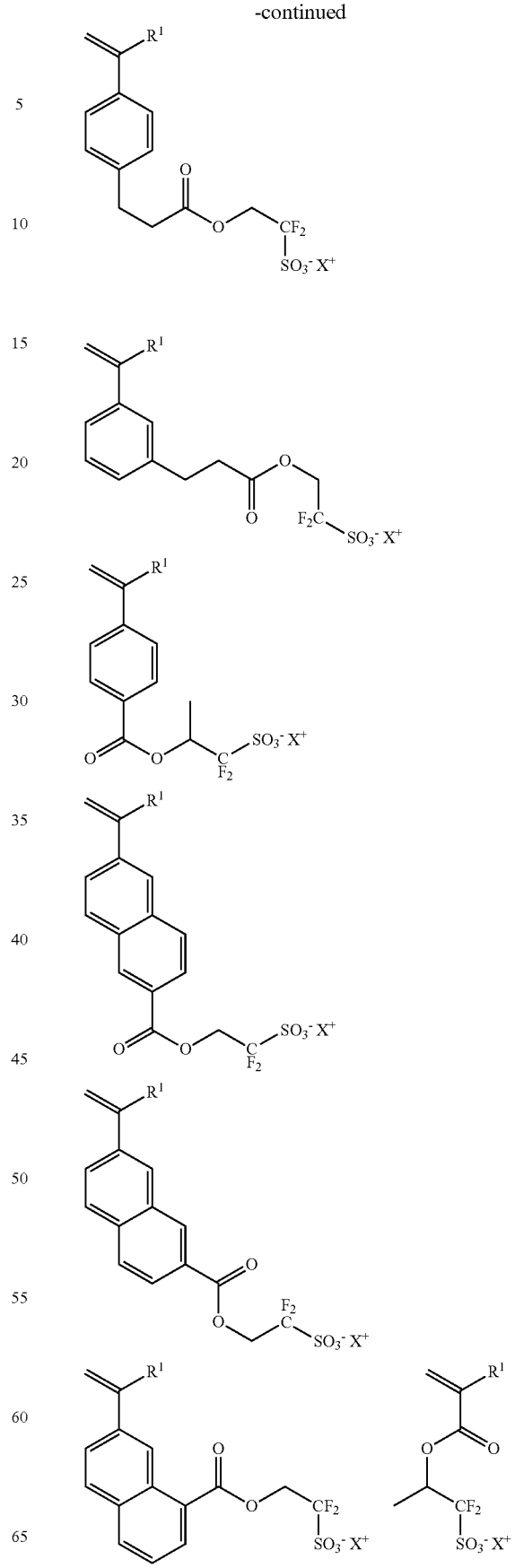

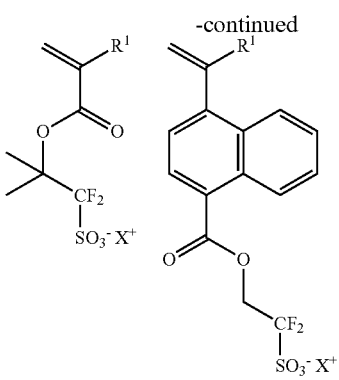
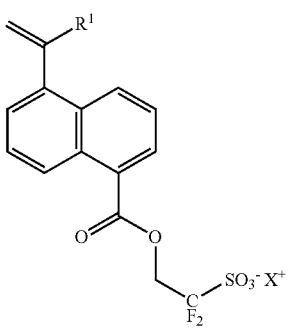
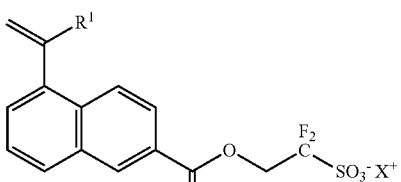
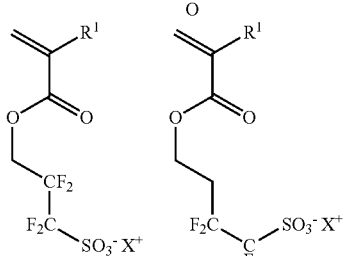
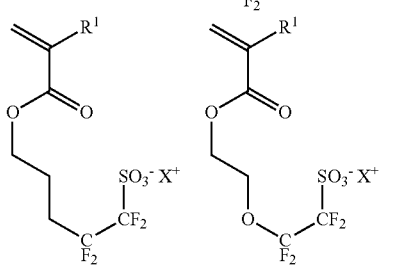
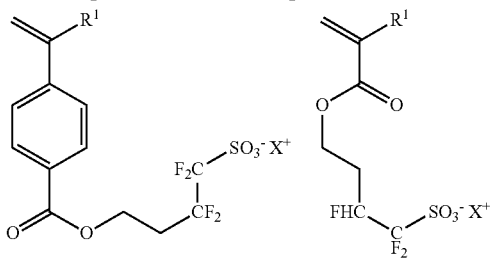

In the formula, $R^1$ has the same meaning as defined above, and X represents lithium, sodium, potassium, or a nitrogen compound.

Also, as mentioned above, the repeating unit (a) represented by the general formula (1) preferably includes one or more kinds selected from repeating units (a1) to (a4) respectively represented by the general formulae (3-1) to (3-4). In other words, among the monomers exemplified above, the monomers from which the repeating units (a1) to (a4) can be obtained are particularly preferred.

Further, as mentioned above, the polymer compound for a conductive polymer of the present invention preferably further contains the repeating unit (b) represented by the general formula (2), and a monomer from which the repeating unit (b) can be obtained may be specifically exemplified by the following.

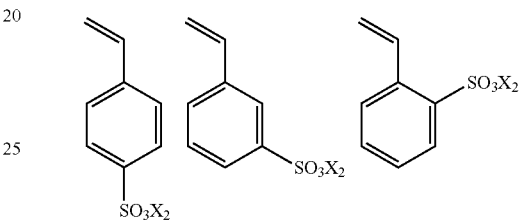

In the formula, $X_2$ represents a hydrogen atom, lithium, sodium, potassium, a nitrogen compound, or a sulfonium compound.

When X and $X_2$ represent a nitrogen compound, a compound represented by the general formula (5) may be mentioned,

(5)

wherein $R^{101d}$, $R^{101e}$, $R^{101f}$, and $R^{101g}$ each represent a hydrogen atom, a linear, branched, or cyclic alkyl group, alkenyl group, oxoalkyl group, or oxoalkenyl group having 1 to 12 carbon atoms, an aryl group having 6 to 20 carbon atoms, or an aralkyl group or an aryloxoalkyl group each having 7 to 12 carbon atoms where a part or all of hydrogen atoms in these groups may be substituted by an alkoxy group (s); $R^{101d}$ and $R^{101e}$, or $R^{101d}$, $R^{101e}$, and $R^{101f}$ may form a ring, and when the ring is formed, $R^{101d}$ and $R^{101e}$, or $R^{101d}$, $R^{101e}$, and $R^{101f}$ represent an alkylene group having 3 to 10 carbon atoms or a heteroaromatic ring having therein the nitrogen atom in the formula.

Also, as mentioned above, the polymer compound for a conductive polymer of the present invention may further contain a repeating unit (c) besides the repeating unit (a) and the repeating unit (b). Examples of the repeating unit (c) include styrene series, vinylnaphthalene series, vinylsilane series, acenaphthylene, indene, and vinylcarbazole.

Illustrative examples of a monomer from which the repeating unit (c) can be obtained may be specifically exemplified by the following.

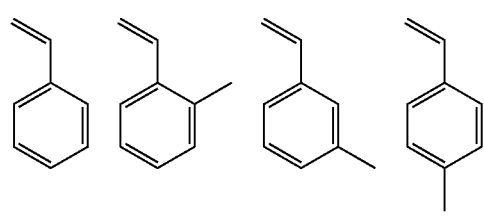
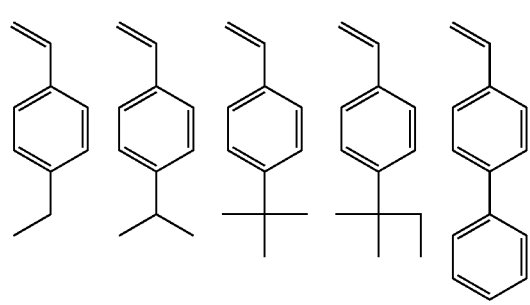
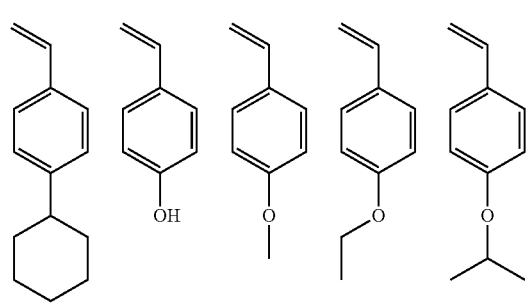
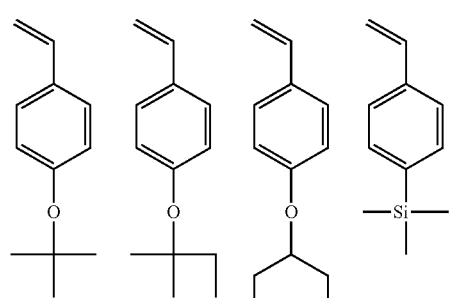
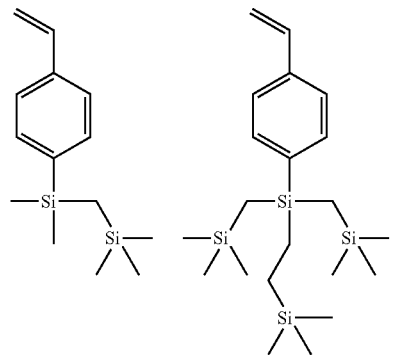
-continued
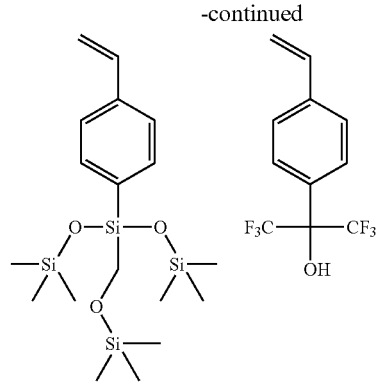
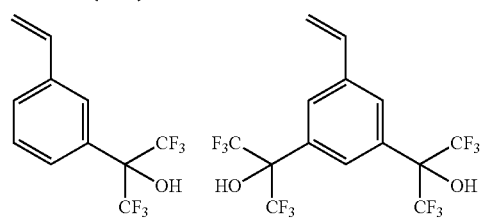
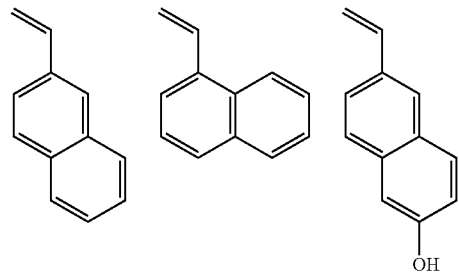
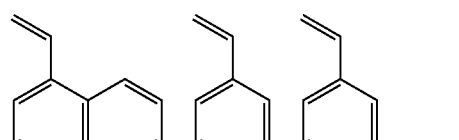
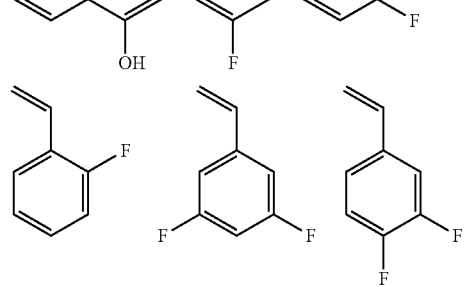
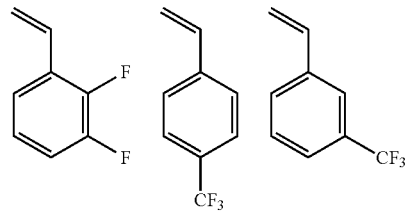
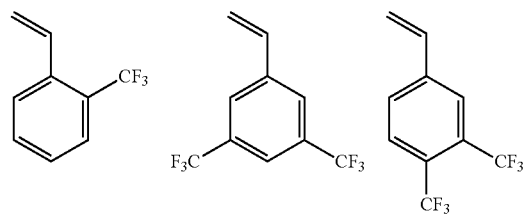

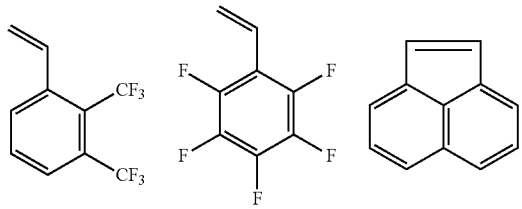
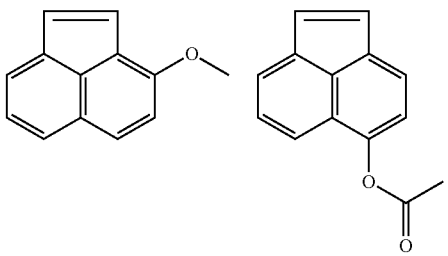
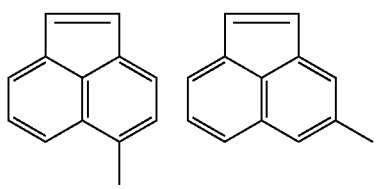
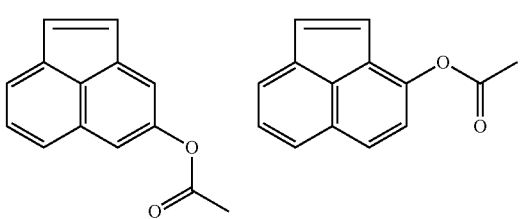
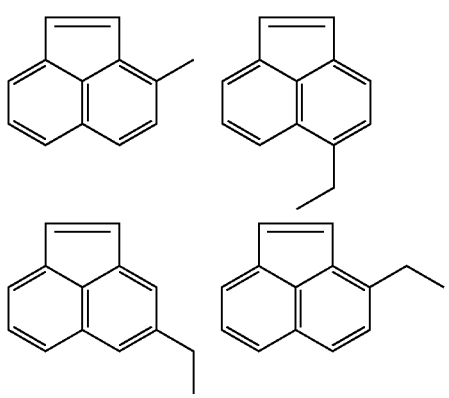
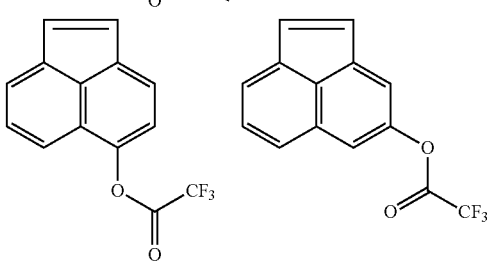
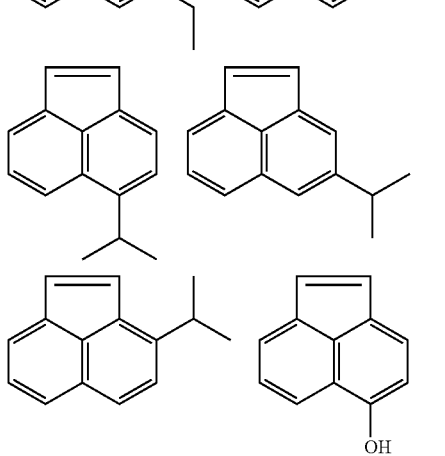
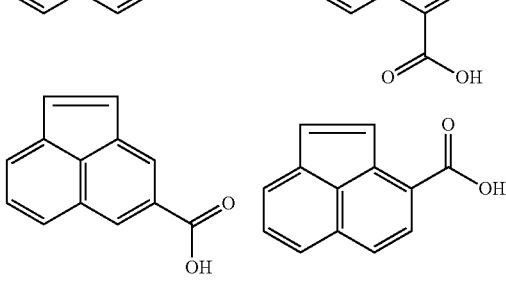
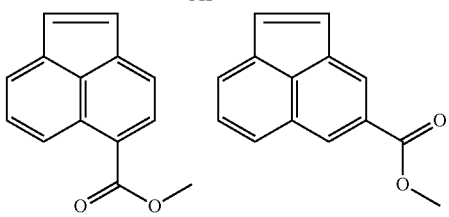
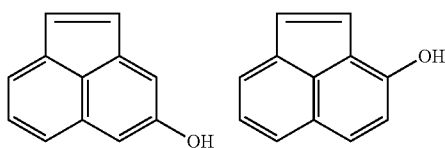
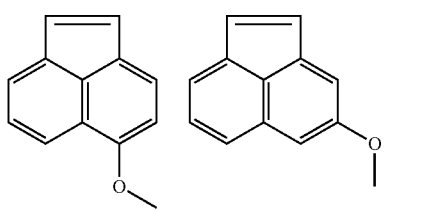
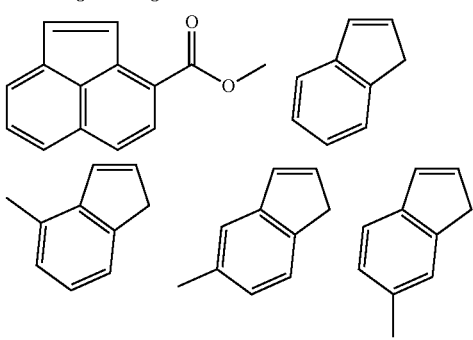

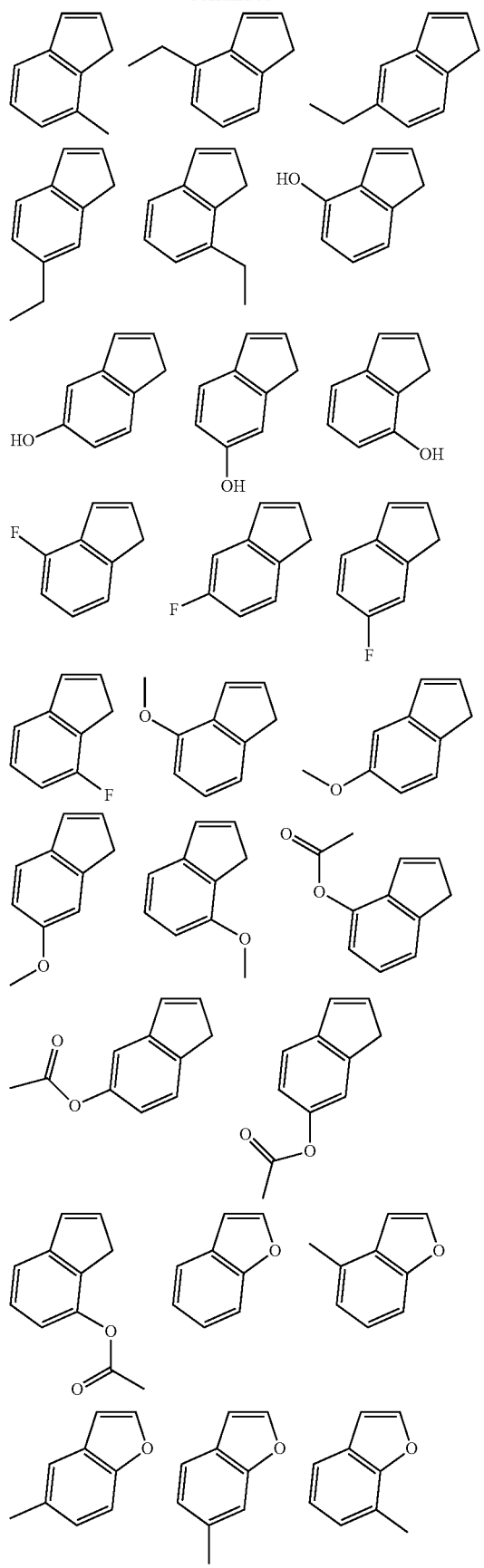
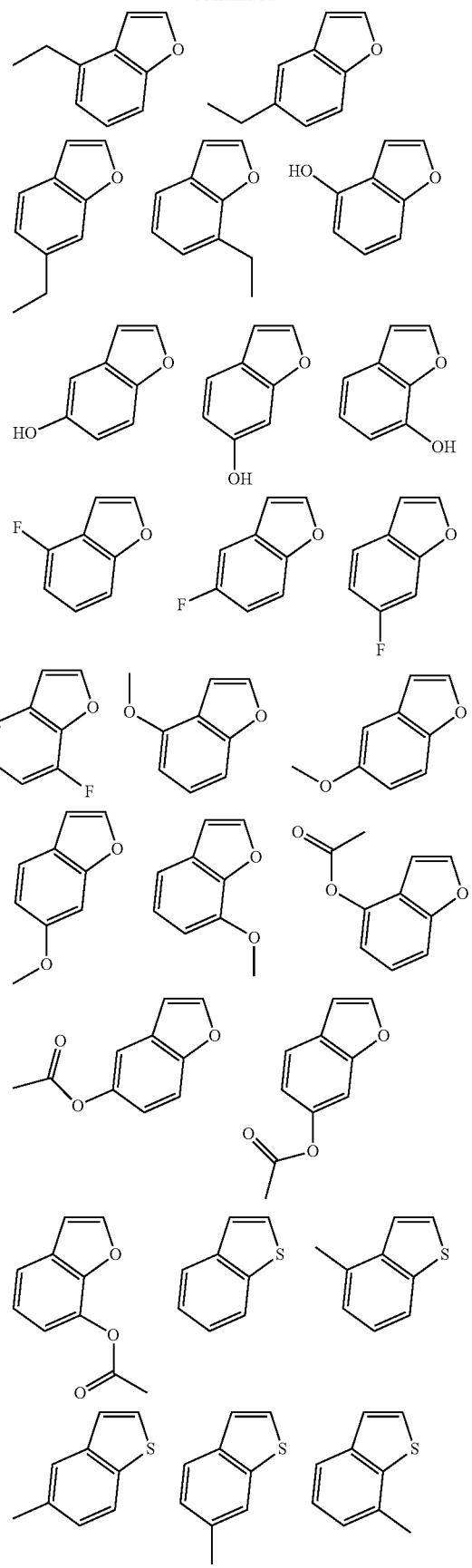

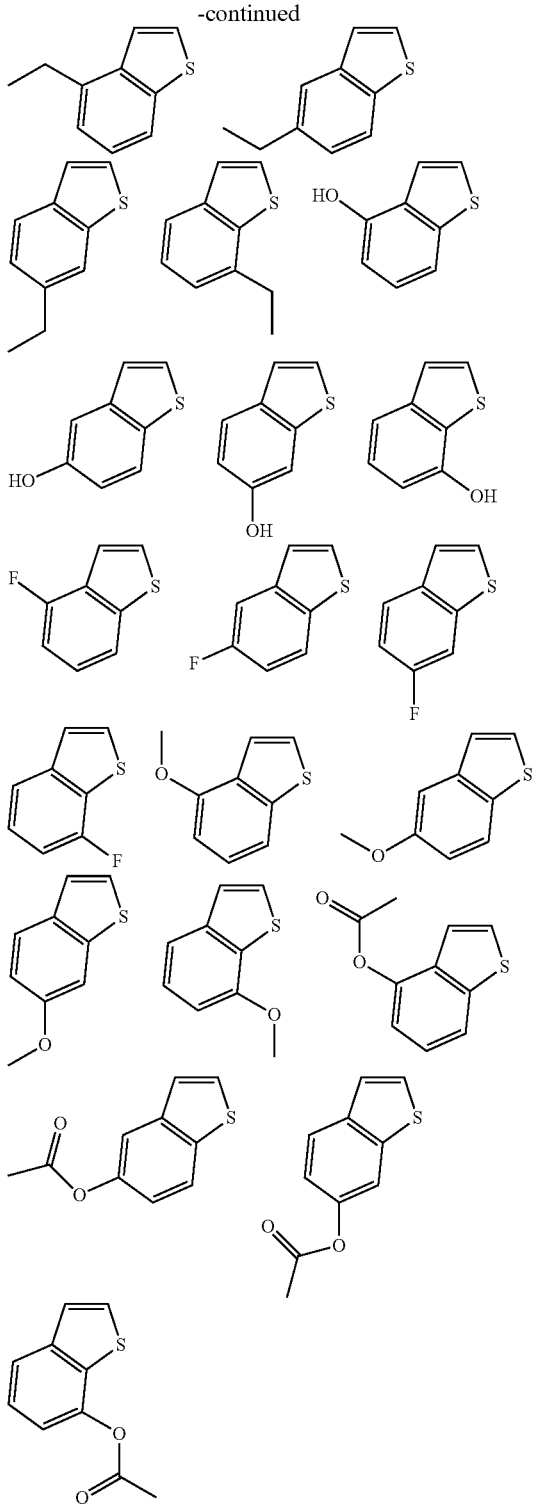

As a method for synthesizing the polymer compound for a conductive polymer of the present invention, for example, a method in which desired monomers among the above-described monomers are subjected to heat polymerization by adding a radical polymerization initiator in a solvent to obtain a polymer compound, which is a copolymer, may be mentioned.

Illustrative examples of the solvent to be used for the polymerization include water, methanol, ethanol, n-propanol, isopropyl alcohol, methoxyethanol, ethoxyethanol, n-butanol, ethylene glycol, propylene glycol, glycerin, diethylene glycol, dimethylsulfoamide, dimethylacetoamide, acetone, dimethylsulfoxide, N-methylpyrrolidone, toluene, benzene, tetrahydrofuran, diethyl ether, dioxane, cyclohexane, cyclopentane, methyl ethyl ketone, and γ-butyrolactone.

Illustrative examples of the radical polymerization initiator include di-tert-butyl peroxide, dicumyl peroxide, tert-butylcumyl peroxide, benzoyl peroxide, dilauryl peroxide, cumene hydroperoxide, tert-butyl hydroperoxide, tert-butyl peroxyisobutyrate, potassium persulfate, ammonium persulfate, hydrogen peroxide, 2,2'-azobisisobutyronitrile (AIBN), 2,2'-azobis(2,4-dimethylvaleronitrile), dimethyl 2,2-azobis (2-methylpropionate), lauroyl peroxide, 2,2'-azobis(2-amidinopropane)dihydrochloride, or an alkali metal salt or an ammonium salt of 4,4'-azobis(4-cyanovaleric acid).

The reaction temperature is preferably in the range of 50 to 80° C., and the reaction time is preferably in the range of 2 to 100 hours, more preferably 5 to 20 hours.

In the polymer compound for a conductive polymer of the present invention, the monomer that gives the repeating unit (a) represented by the general formula (1) may be used alone or in combination with two or more kinds, and it is preferred to combine methacryl type and styrene type monomers for the sake of enhancing polymerizability.

In addition, two or more kinds of monomers constituting the repeating unit (a) may be random-copolymerized, or may be each block-copolymerized. When a block-copolymerized polymer (block copolymer) is used as a conductive film, it can be expected to obtain a merit that the conductivity is improved by aggregating the repeating unit portions composed of the two or more kinds of the repeating units (a) with each other to form a sea-island structure.

Moreover, the monomers that give the repeating units (a) to (c) may be random-copolymerized, or may be each block-copolymerized. In this case, it can also be expected to obtain a merit that the conductivity is improved due to the block copolymer as explained for the repeating unit (a) above.

When a random copolymerization is carried out by a radical polymerization, the method is generally used in which monomers and a radical polymerization initiator to be used for the copolymerization are mixed and polymerized by heating. In the case that the polymerization is started with a first monomer in the presence of a radical polymerization initiator, and then adding a second monomer thereto later, the resulting polymer has a structure that the first monomer is polymerized at one side of the polymer molecule, and the second monomer is polymerized at the other side. In this case, however, the repeating units of the first and second monomers are mixedly present at the middle portion, thus it has a different structure from the block copolymer. For forming the block copolymer by radical polymerization, living radical polymerization is preferably used.

In a living radical polymerization method called RAFT polymerization (Reversible Addition Fragmentation chain Transfer polymerization), radicals at the polymer terminal are always living, so that it is possible to form a block copolymer composed of first and second repeating units by starting the polymerization with a first monomer, and then adding a second monomer at the time when the first monomer has been consumed. In addition, it is also possible to form a triblock copolymer by starting the polymerization with a first monomer, then adding a second monomer at the time when the first monomer has been consumed, and then adding a third monomer thereto.

When the RAFT polymerization is carried out, there is a characteristic that a narrowly distributed polymer having a narrow molecular weight distribution (degree of distribution) is obtained. In particular, when the RAFT polymerization is carried out by adding monomers at once, a polymer having a narrower molecular weight distribution can be obtained.

The polymer compound for a conductive polymer of the present invention preferably has a narrow distribution, and the molecular weight distribution (Mw/Mn) thereof is preferably in the range of 1.0 to 2.0, particularly preferably 1.0 to 1.5. The narrow distribution allows to prevent unevenness of the conductivity of the conductive polymer synthesized by using the polymer compound.

To carry out the RAFT polymerization, a chain transfer agent is necessary, and illustrative examples thereof include 2-cyano-2-propylbenzothioate, 4-cyano-4-(phenylcarbonothioylthio)pentanoic acid, 2-cyano-2-propyldodecyltrithiocarbonate, 4-cyano-4-[(dodecylsulfanylthiocarbonyl)sulfanyl]pentanoic acid, 2-(dodecylthiocarbonothioylthio)-2-methylpropanoic acid, cyanomethyldodecylthiocarbonate, cyanomethylmethyl-(phenyl)carbamothioate, bis(thiobenzoyl)disulfide, and bis(dodecylsulfanylthiocarbonyl)disulfide. Among these, 2-cyano-2-propylbenzothioate is particularly preferred.

The proportion of the repeating units (a) to (c) is 0<a≤1.0, 0≤b<1.0, and 0≤c<1.0, preferably 0.1≤a≤0.9, 0.1≤b≤0.9, and 0≤c≤0.8, more preferably 0.2≤a≤0.8, 0.2≤b≤0.8, and 0≤c≤0.5.

Also, it is preferred that a+b+c=1.

Further, when the repeating unit (a) includes one or more kinds selected from repeating units (a1) to (a4) as mentioned above, it is preferred that 0≤a1≤1.0, 0≤a2≤1.0, 0≤a3≤1.0, 0≤a4≤1.0, and 0<a1+a2+a3+a4≤1.0, more preferably 0≤a1≤0.9, 0≤a2≤0.9, 0≤a3≤0.9, 0≤a4≤0.9, and 0.1≤a1+a2+a3+a4≤0.9, much more preferably 0≤a1≤0.8 0≤a2≤0.8, 0≤a3≤0.8, 0≤a4≤0.8, and 0.2≤a1+a2+a3+a4≤0.8.

In the method for producing the polymer compound for a conductive polymer of the present invention, after polymerizing monomers as mentioned above, the structure of the salt composed of the sulfonic acid residue and the lithium, the sodium, the potassium, or the nitrogen compound is converted into a sulfo group by ion-exchange.

At this time, ion-exchanging may be carried out by using, for example, an ion exchange resin.

The polymer compound for a conductive polymer containing the repeating unit (a) represented by the general formula (1) can be easily produced by the method as mentioned above.

As mentioned above, the polymer compound for a conductive polymer of the present invention can be a polymer compound for a conductive polymer having a specific superacidic sulfo group which is soluble in an organic solvent, and suitably used for a fuel cell or a dopant for a conductive material.

When this polymer compound for a conductive polymer is used for a fuel cell, a material for a fuel cell having high dielectric constant can be obtained. Also, when this polymer compound is used as a dopant for a conjugated double bond polymer, a conductive film having high transparency, high conductivity, and high durability can be formed. Moreover, it is excellent in solubility in an organic solvent, so that deterioration of an organic EL device can be prevented by using it as a conductive film for an organic EL lighting.

Further, the producing method of the present invention facilitates producing such a polymer compound for a conductive polymer of the present invention.

EXAMPLES

In the following, the present invention is explained specifically by referring to Examples, but the present invention is not limited to these.

In the following, monomers used in syntheses of Examples are shown.

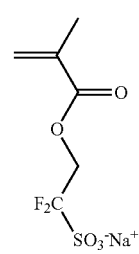

Monomer 1

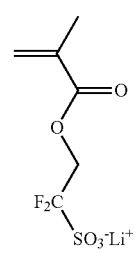

Monomer 2

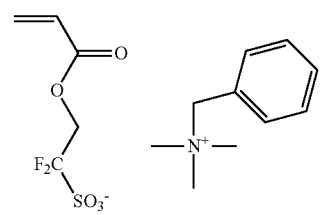

Monomer 3

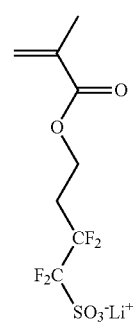

Monomer 4

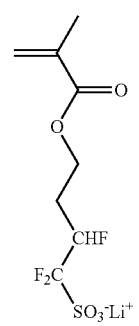

Monomer 5

Monomer 6

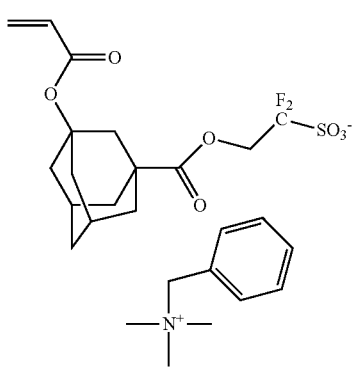

Monomer 7

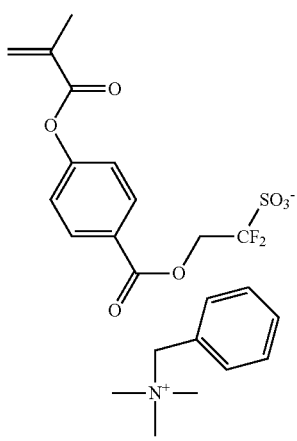

Monomer 8

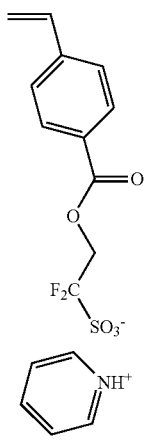

Monomer 1: sodium 1,1-difluoro-2-(methacryloyloxy)ethyl-1-sulfonate
Monomer 2: lithium 1,1-difluoro-2-(methacryloyloxy)ethyl-1-sulfonate
Monomer 3: benzyltrimethylammonium 1,1-difluoro-2-(acryloyloxy)ethyl-1-sulfonate
Monomer 4: lithium 1,1,2,2-tetrafluoro-4-(methacryloyloxy)butyl-1-sulfonate
Monomer 5: lithium 1,1,2-trifluoro-4-(methacryloyloxy)butyl-1-sulfonate
Monomer 6: benzyltrimethylammonium 1,1-difluoro-2-(3-acryloyloxy-adamantane-1-carbonyloxy)-ethyl-1-sulfonate
Monomer 7: benzyltrimethylammonium 1,1-difluoro-2-(4-methacryloyloxy-benzene-1-carbonyloxy)-ethyl-1-sulfonate
Monomer 8: pyridinium 2-(4-vinylbenzoyloxy)-1,1-difluoroethyl-1-sulfonate Example 1

Under nitrogen atmosphere, to 37.5 g of methanol stirred at 64° C. was added dropwise a solution in which 25.1 g of Monomer 1 and 5.13 g of dimethyl 2,2'-azobis(isobutyrate) had been dissolved in 112.5 g of methanol, over 4 hours. The mixture was further stirred at 64° C. for 4 hours. After cooling to room temperature, the mixture was added dropwise to 1,000 g of ethyl acetate under vigorous stirring. The resulting solid was collected by filtration, and dried under vacuum at 50° C. for 15 hours to obtain 20.2 g of a white polymer.

The obtained white polymer was dissolved in 912 g of pure water, and the sodium salt was converted into a sulfo group by using an ion exchange resin. When the obtained polymer was measured by $^{19}$F-NMR, $^{1}$H-NMR, and GPC, the following analytical results could be obtained.

Weight average molecular weight (Mw)=43,000

Molecular weight distribution (Mw/Mn)=1.89

This polymer compound was named Polymer 1.

Polymer 1

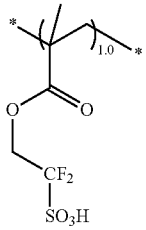

Example 2

Under nitrogen atmosphere, to 37.5 g of methanol stirred at 64° C. was added dropwise a solution in which 11.8 g of Monomer 2, 9.5 g of lithium styrenesulfonate, and 5.13 g of dimethyl 2,2'-azobis(isobutyrate) had been dissolved in 112.5 g of methanol, over 4 hours. The mixture was further stirred at 64° C. for 4 hours. After cooling to room temperature, the mixture was added dropwise to 1,000 g of ethyl acetate under vigorous stirring. The resulting solid was collected by filtration, and dried under vacuum at 50° C. for 15 hours to obtain 19.3 g of a white polymer.

The obtained white polymer was dissolved in 912 g of pure water, and the lithium salts were converted into sulfo groups by using an ion exchange resin. When the obtained polymer was measured by $^{19}$F-NMR, $^{1}$H-NMR, and GPC, the following analytical results could be obtained.

Copolymer composition ratio (Molar ratio)

Monomer 2:styrenesulfonic acid=1:1

Weight average molecular weight (Mw)=57,000

Molecular weight distribution (Mw/Mn)=1.84

This polymer compound was named Polymer 2.

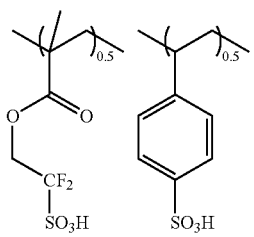
Polymer 2

Example 3

Under nitrogen atmosphere, to 37.5 g of methanol stirred at 64° C. was added dropwise a solution in which 36.5 g of Monomer 3 and 5.13 g of dimethyl 2,2'-azobis(isobutyrate) had been dissolved in 112.5 g of methanol, over 4 hours. The mixture was further stirred at 64° C. for 4 hours. After cooling to room temperature, the mixture was added dropwise to 1,000 g of ethyl acetate under vigorous stirring. The resulting solid was collected by filtration, and dried under vacuum at 50° C. for 15 hours to obtain 29.5 g of a white polymer.

The obtained white polymer was dissolved in 912 g of pure water, and the benzyltrimethylammonium salt was converted into a sulfo group by using an ion exchange resin. When the obtained polymer was measured by $^{19}$F-NMR, $^{1}$H-NMR, and GPC, the following analytical results could be obtained.

Weight average molecular weight (Mw)=36,000
Molecular weight distribution (Mw/Mn)=1.65
This polymer compound was named Polymer 3.

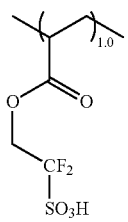
Polymer 3

Example 4

Under nitrogen atmosphere, to 37.5 g of methanol stirred at 64° C. was added dropwise a solution in which 15.0 g of Monomer 4, 9.5 g of lithium styrenesulfonate, and 2.82 g of dimethyl 2,2'-azobis(isobutyrate) had been dissolved in 112.5 g of methanol, over 4 hours. The mixture was further stirred at 64° C. for 4 hours. After cooling to room temperature, the mixture was added dropwise to 1,000 g of ethyl acetate under vigorous stirring. The resulting solid was collected by filtration, and dried under vacuum at 50° C. for 15 hours to obtain 21.5 g of a white polymer.

The obtained white polymer was dissolved in 421 g of methanol, and the lithium salts were converted into sulfo groups by using an ion exchange resin. When the obtained polymer was measured by $^{19}$F-NMR, $^{1}$H-NMR, and GPC, the following analytical results could be obtained.

Copolymer composition ratio (Molar ratio)
Monomer 4:styrenesulfonic acid=1:1
Weight average molecular weight (Mw)=53,000
Molecular weight distribution (Mw/Mn)=1.81
This polymer compound was named Polymer 4.

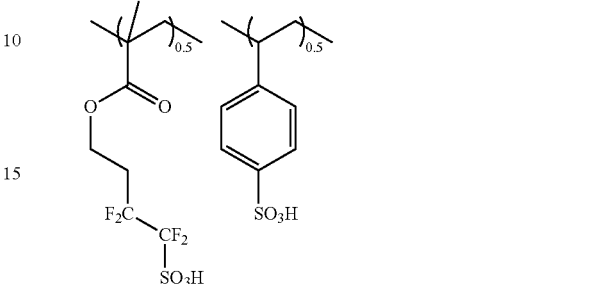
Polymer 4

Example 5

Under nitrogen atmosphere, to 37.5 g of methanol stirred at 64° C. was added dropwise a solution in which 14.1 g of Monomer 5, 9.5 g of lithium styrenesulfonate, and 2.82 g of dimethyl 2,2'-azobis(isobutyrate) had been dissolved in 112.5 g of methanol, over 4 hours. The mixture was further stirred at 64° C. for 4 hours. After cooling to room temperature, the mixture was added dropwise to 1,000 g of ethyl acetate under vigorous stirring. The resulting solid was collected by filtration, and dried under vacuum at 50° C. for 15 hours to obtain 21.5 g of a white polymer.

The obtained white polymer was dissolved in 421 g of methanol, and the lithium salts were converted into sulfo groups by using an ion exchange resin. When the obtained polymer was measured by $^{19}$F-NMR, $^{1}$H-NMR, and GPC, the following analytical results could be obtained.

Copolymer composition ratio (Molar ratio)
Monomer 5:styrenesulfonic acid=1:1
Weight average molecular weight (Mw)=51,000
Molecular weight distribution (Mw/Mn)=1.79
This polymer compound was named Polymer 5.

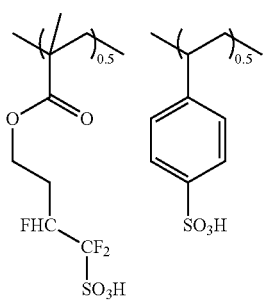
Polymer 5

Example 6

Under nitrogen atmosphere, to 37.5 g of methanol stirred at 64° C. was added dropwise a solution in which 16.3 g of Monomer 6, 13.3 g of lithium styrenesulfonate, and 4.19 g of dimethyl 2,2'-azobis(isobutyrate) had been dissolved in 112.5 g of methanol, over 4 hours. The mixture was further stirred at 64° C. for 4 hours. After cooling to room temperature, the mixture was added dropwise to 1,000 g of ethyl acetate under vigorous stirring. The resulting solid was collected by filtration, and dried under vacuum at 50° C. for 15 hours to obtain 26.0 g of a white polymer.

The obtained white polymer was dissolved in 396 g of methanol, and the benzyltrimethylammonium salt and the lithium salt were converted into sulfo groups by using an ion exchange resin. When the obtained polymer was measured by $^{19}$F-NMR, $^1$H-NMR, and GPC, the following analytical results could be obtained.

Copolymer composition ratio (Molar ratio)
Monomer 6:styrenesulfonic acid=3:7
Weight average molecular weight (Mw)=39,300
Molecular weight distribution (Mw/Mn)=1.91
This polymer compound was named Polymer 6.

Polymer 6

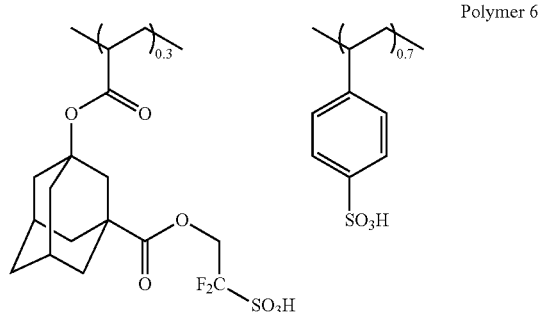

Example 7

Under nitrogen atmosphere, to 37.5 g of methanol stirred at 64° C. was added dropwise a solution in which 15.0 g of Monomer 7, 13.3 g of lithium styrenesulfonate, and 4.19 g of dimethyl 2,2'-azobis(isobutyrate) had been dissolved in 112.5 g of methanol, over 4 hours. The mixture was further stirred at 64° C. for 4 hours. After cooling to room temperature, the mixture was added dropwise to 1,000 g of ethyl acetate under vigorous stirring. The resulting solid was collected by filtration, and dried under vacuum at 50° C. for 15 hours to obtain 24.9 g of a white polymer.

The obtained white polymer was dissolved in 396 g of methanol, and the benzyltrimethylammonium salt and the lithium salt were converted into sulfo groups by using an ion exchange resin. When the obtained polymer was measured by $^{19}$F-NMR, $^1$H-NMR, and GPC, the following analytical results could be obtained.

Copolymer composition ratio (Molar ratio)
Monomer 7:styrenesulfonic acid=3:7
Weight average molecular weight (Mw)=41,100
Molecular weight distribution (Mw/Mn)=1.98
This polymer compound was named Polymer 7.

Polymer 7

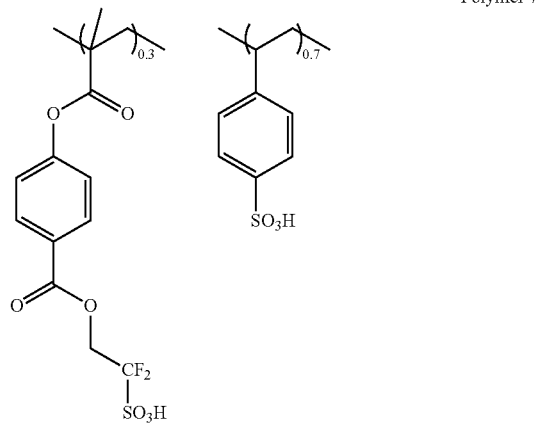

Example 8

Under nitrogen atmosphere, to 37.5 g of methanol stirred at 64° C. was added dropwise a solution in which 37.1 g of Monomer 8 and 4.19 g of dimethyl 2,2'-azobis(isobutyrate) had been dissolved in 112.5 g of methanol, over 4 hours. The mixture was further stirred at 64° C. for 4 hours. After cooling to room temperature, the mixture was added dropwise to 1,000 g of ethyl acetate under vigorous stirring. The resulting solid was collected by filtration, and dried under vacuum at 50° C. for 15 hours to obtain 33.1 g of a white polymer.

The obtained white polymer was dissolved in 396 g of methanol, and the pyridinium salt was converted into a sulfo group by using an ion exchange resin. When the obtained polymer was measured by $^{19}$F-NMR, $^1$H-NMR, and GPC, the following analytical results could be obtained.

Weight average molecular weight (Mw)=36,000
Molecular weight distribution (Mw/Mn)=1.69
This polymer compound was named Polymer 8.

Polymer 8

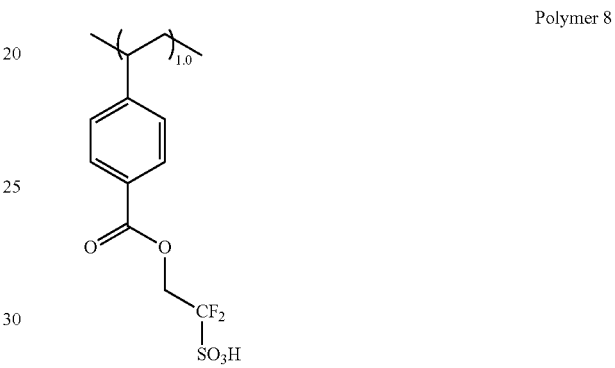

Example 9

Under nitrogen atmosphere, to 37.5 g of methanol stirred at 64° C. was added dropwise a solution in which 26.0 g of Monomer 8, 5.7 g of lithium styrenesulfonate, and 4.19 g of dimethyl 2,2'-azobis(isobutyrate) had been dissolved in 112.5 g of methanol, over 4 hours. The mixture was further stirred at 64° C. for 4 hours. After cooling to room temperature, the mixture was added dropwise to 1,000 g of ethyl acetate under vigorous stirring. The resulting solid was collected by filtration, and dried under vacuum at 50° C. for 15 hours to obtain 26.9 g of a white polymer.

The obtained white polymer was dissolved in 396 g of methanol, and the pyridinium salt and the lithium salt were converted into sulfo groups by using an ion exchange resin. When the obtained polymer was measured by $^{19}$F-NMR, $^1$H-NMR, and GPC, the following analytical results could be obtained.

Copolymer composition ratio (Molar ratio)
Monomer 8:styrenesulfonic acid=7:3
Weight average molecular weight (Mw)=41,000
Molecular weight distribution (Mw/Mn)=1.67
This polymer compound was named Polymer 9.

Polymer 9

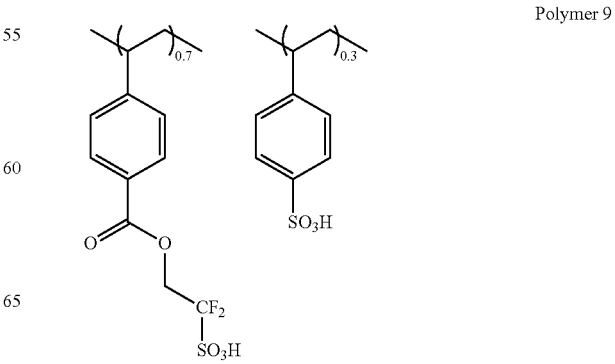

Example 10

Under nitrogen atmosphere, to 37.5 g of methanol stirred at 64° C. was added dropwise a solution in which 18.3 g of Monomer 3, 9.3 g of Monomer 8, 12.3 g of 4-(1,1,1,3,3,3-hexafluoro-2-propanol)styrene, and 4.19 g of dimethyl 2,2'-azobis(isobutyrate) had been dissolved in 112.5 g of methanol, over 4 hours. The mixture was further stirred at 64° C. for 4 hours. After cooling to room temperature, the mixture was added dropwise to 1,000 g of ethyl acetate under vigorous stirring. The resulting solid was collected by filtration, and dried under vacuum at 50° C. for 15 hours to obtain 31.7 g of a white polymer.

The obtained white polymer was dissolved in 396 g of methanol, and the benzyltrimethylammonium salt and the pyridinium salt were converted into sulfo groups by using an ion exchange resin. When the obtained polymer was measured by $^{19}$F-NMR, $^{1}$H-NMR, and GPC, the following analytical results could be obtained.

Copolymer composition ratio (Molar ratio)
Monomer 3:Monomer 8:4-(1,1,1,3,3,3-hexafluoro-2-propanol)styrene=2:1:1
Weight average molecular weight (Mw)=39,800
Molecular weight distribution (Mw/Mn)=1.77
This polymer compound was named Polymer 10.

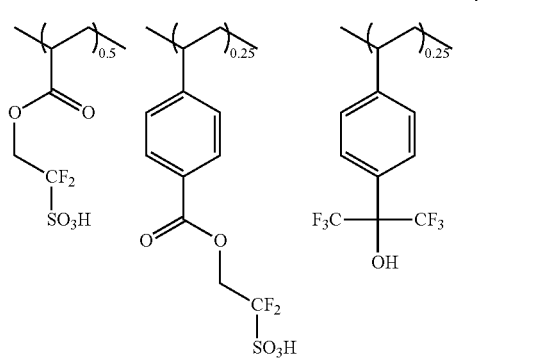

Polymer 10

Example 11

A diblock copolymer was synthesized according to the RAFT polymerization mentioned below.

Under nitrogen atmosphere, in 37.5 g of methanol were dissolved 0.42 g of 2-cyano-2-propylbenzodithioate and 0.10 g of 2,2'-azobisisobutyronitrile, and the solution was stirred at 64° C. for 3 hours under nitrogen atmosphere. To the solution was added dropwise a solution in which 18.6 g of Monomer 8 had been dissolved in 64.3 g of methanol, over 2 hours. Subsequently, to the solution was added dropwise a solution in which 18.3 g of Monomer 3 had been dissolved in 48.2 g of methanol, over 2 hours. After completion of the dropwise addition, the mixture was stirred at 64° C. for 4 hours. After cooling to room temperature, the mixture was added dropwise to 1,000 g of ethyl acetate under vigorous stirring. The resulting solid was collected by filtration, and dried under vacuum at 50° C. for 15 hours to obtain 33.8 g of a red polymer.

The obtained red polymer was dissolved in 306 g of methanol, and the pyridinium salt and the benzyltrimethylammonium salt were converted into sulfo groups by using an ion exchange resin. When the obtained polymer was measured by $^{19}$F-NMR, $^{1}$H-NMR, and GPC, the following analytical results could be obtained.

Copolymer composition ratio (Molar ratio)
Monomer 8:Monomer 3=1:1
Weight average molecular weight (Mw)=29,000
Molecular weight distribution (Mw/Mn)=1.33
This polymer compound was named Polymer 11.

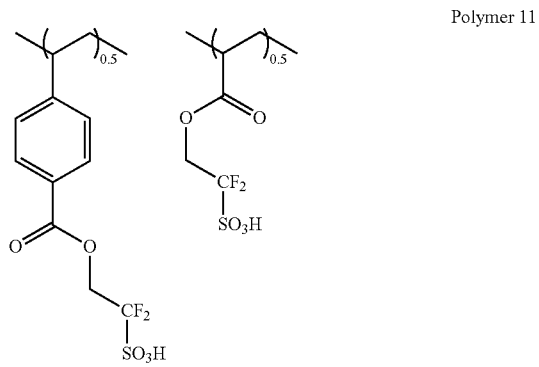

Polymer 11

Example 12

A triblock copolymer was synthesized according to the RAFT polymerization mentioned below.

Under nitrogen atmosphere, in 37.5 g of methanol were dissolved 0.42 g of 2-cyano-2-propylbenzodithioate and 0.10 g of 2,2'-azobisisobutyronitrile, and the solution was stirred at 64° C. for 3 hours under nitrogen atmosphere. To the solution was added dropwise a solution in which 9.3 g of Monomer 8 had been dissolved in 32.2 g of methanol, over 2 hours. Subsequently, to the solution was added dropwise a solution in which 18.3 g of Monomer 3 had been dissolved in 48.2 g of methanol, over 2 hours. To the solution was added dropwise a solution in which 9.3 g of Monomer 8 had been dissolved in 32.2 g of methanol, over 2 hours. After completion of the dropwise addition, the mixture was stirred at 64° C. for 4 hours. After cooling to room temperature, the mixture was added dropwise to 1,000 g of ethyl acetate under vigorous stirring. The resulting solid was collected by filtration, and dried under vacuum at 50° C. for 15 hours to obtain 30.9 g of a red polymer.

The obtained red polymer was dissolved in 306 g of methanol, and the pyridinium salt and the benzyltrimethylammonium salt were converted into sulfo groups by using an ion exchange resin. When the obtained polymer was measured by $^{19}$F-NMR, $^{1}$H-NMR, and GPC, the following analytical results could be obtained.

Copolymer composition ratio (Molar ratio)
Monomer 8:Monomer 3=1:1
Weight average molecular weight (Mw)=26,000
Molecular weight distribution (Mw/Mn)=1.39
This polymer compound was named Polymer 12.

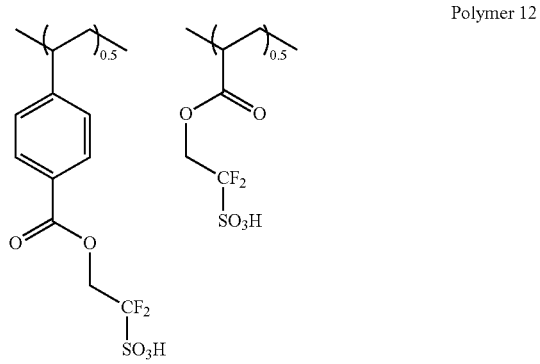

Polymer 12

Polymers 1 to 12 synthesized as mentioned above were each soluble in water, methanol, ethanol, isopropyl alcohol, propylene glycol monomethyl ether, tetrahydrofuran, and dimethyl formamide.

Thus, the producing method of the present invention facilitates producing the polymer compound for a conductive polymer of the present invention, which has a specific superacidic sulfo group, and is soluble in an organic solvent.

It should be noted that the present invention is not limited to the above-described embodiments. The above-described embodiments are described for illustrative purposes, and those having substantially the same configuration and those providing the same operational advantage as the technical concept described in the claims of the present invention are all encompassed in the technical scope of the present invention.

What is claimed is:

1. A polymer compound for an electrically conductive polymer, comprising:

one or more repeating units (a) selected from the consisting of repeating unit (a2) represented by the following general formula (3-2), repeating unit (a3) reresented by the following general formula (3-3), and repeating unit (a4) represented by the following general formula (3-4);

a repeating unit (b) represented by the following general formula (2); and a repeating unit (a1) represented by the following general formula (3-1), the polymer compound for an electrically conductive polymer being synthesized by ion-exchange of a lithium salt, a sodium salt, a potassium salt, or a molecular weight in the range of 1,000 to 500,000.

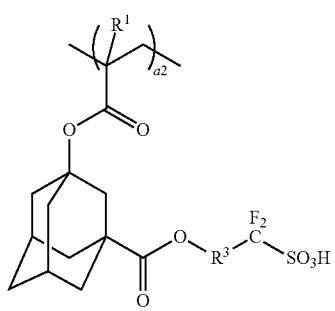

(3-2)

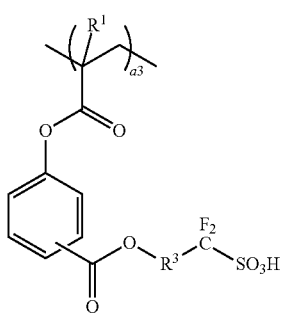

(3-3)

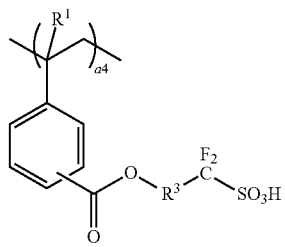

(3-4)

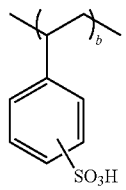

(2)

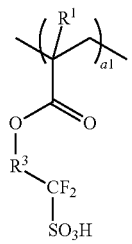

(3-1)

where:
$R^1$ represents a hydrogen atom or a methyl group;
$R^3$ represents a linear or branched alkylene group having 1 to 4 carbon atoms where one or two hydrogen atoms in $R^3$ may be substituted by a fluorine atom(s);
a2, a3, and a4 are each a number satisfying $0 \leq a2 < 1.0$, $0 \leq a3 < 1.0$, $0 \leq a4 < 1.0$, and $0 < a2+a3+a4 < 1.0$;
"b" is a number satisfying $0 < b < 1.0$; and
a1 is a number satisfying $0 < a1 < 1.0$.

2. The polymer compound according to claim 1, wherein the lithium salt, the sodium salt, the potassium salt, or the nitrogen compound salt of the sulfonic acid residue is composed of a repeating unit represented by the following general formula (4),

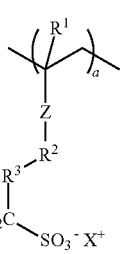

(4)

where:
$R^1$ represents a hydrogen atom or a methyl group;
$R^2$ represents a single bond, an ester group, or a linear, branched, or cyclic hydrocarbon group having 1 to 12 carbon atoms and optionally having either or both of an ether group and an ester group;
$R^3$ represents a linear or branched alkylene group having 1 to 4 carbon atoms where one or two hydrogen atoms in $R^3$ may be substituted by a fluorine atom(s);

Z represents a phenylene group, a naphthylene group, or an ester group, and when Z is a phenylene group, $R^2$ does not include an ether group;

"a" is a number satisfying $0<a<1.0$

X represents lithium, sodium, potassium, or a nitrogen compound represented by the following general formula (5),

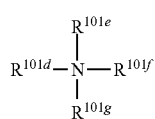
(5)

where:
$R^{101d}$, $R^{101e}$, $R^{101f}$, and $R^{101g}$ each represent a hydrogen atom, a linear, branched, or cyclic alkyl group, alkenyl group, oxoalkyl group, or oxoalkenyl group having 1 to 12 carbon atoms, an aryl group having 6 to 20 carbon atoms, or an aralkyl group or an aryloxoalkyl group each having 7 to 12 carbon atoms where a part or all of hydrogen atoms in these groups may be substituted by an alkoxy group(s);

$R^{101d}$ and $R^{101e}$, or $R^{101d}$, $R^{101e}$, and $R^{101f}$ may form a ring, and when the ring is formed, $R^{101d}$ and $R^{101e}$, or $R^{101d}$, $R^{101e}$, and $R^{101f}$ represent an alkylene group having 3 to 10 carbon atoms or a heteroaromatic ring having therein the nitrogen atom in the formula.

* * * * *

UNITED STATES PATENT AND TRADEMARK OFFICE
CERTIFICATE OF CORRECTION

PATENT NO. : 9,663,593 B2
APPLICATION NO. : 14/752425
DATED : May 30, 2017
INVENTOR(S) : Jun Hatakeyama et al.

It is certified that error appears in the above-identified patent and that said Letters Patent is hereby corrected as shown below:

In the Claims

In Claim 1, at Column 37, Lines 23-24, "selected from the consisting of" should be --selected from the group consisting of--.

In Claim 1, at Column 37, Lines 36-37, "a potassium salt, or a molecular weight in the range of 1,000 to 500,000" should be --a potassium salt, or a nitrogen compound salt of a sulfonic acid residue, and having a weight average molecular weight in the range of 1,000 to 500,000--.

Signed and Sealed this
Twenty-first Day of November, 2017

Joseph Matal
*Performing the Functions and Duties of the
Under Secretary of Commerce for Intellectual Property and
Director of the United States Patent and Trademark Office*